US012637290B2

(12) United States Patent (10) Patent No.: US 12,637,290 B2

Morikawa (45) Date of Patent: May 26, 2026

(54) TRANSPORT DEVICE AND TRANSPORT DEVICE CONTROL METHOD

(71) Applicant: DAIFUKU CO., LTD., Osaka (JP)

(72) Inventor: Yasushi Morikawa, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 398 days.

(21) Appl. No.: 18/462,515

(22) Filed: Sep. 7, 2023

(65) Prior Publication Data

US 2024/0109722 A1 Apr. 4, 2024

(30) Foreign Application Priority Data

Oct. 4, 2022 (JP) ................................ 2022-160462

(51) Int. Cl.
B65G 1/137 (2006.01)

(52) U.S. Cl.
CPC ......... B65G 1/1371 (2013.01); B65G 1/1373 (2013.01); B65G 2203/0216 (2013.01); B65G 2203/0233 (2013.01); B65G 2203/041 (2013.01)

(58) Field of Classification Search
CPC ................ B65G 1/1371; B65G 1/1373; B65G 2203/0216; B65G 2203/0233; B65G 2203/041; B65G 1/0492; B65G 35/00; B65G 41/02; B65G 43/00; B65G 2201/02; B65G 2203/0283; B65G 1/0457; B65G 35/06; B65G 2201/0297; H01L 21/67706; H01L 21/67733; H01L 21/67259; H01L 21/67294; H01L 21/6773
See application file for complete search history.

(56) References Cited

U.S. PATENT DOCUMENTS

| | | | | |
|---|---|---|---|---|
| 2008/0056864 A1* | 3/2008 | Wada | .................... | B65G 1/0457 |
| | | | | 700/28 |
| 2019/0031452 A1* | 1/2019 | Koga | .................... | B65G 47/905 |
| 2021/0331714 A1 | 10/2021 | Wada | | |
| 2022/0024690 A1* | 1/2022 | Abe | .................. | H01L 21/67733 |

FOREIGN PATENT DOCUMENTS

| | | |
|---|---|---|
| JP | 2008-056450 A | 3/2008 |
| JP | 2012-150588 A | 8/2012 |
| JP | 2021-171848 A | 11/2021 |

OTHER PUBLICATIONS

Japanese Office Action and English translation thereof for Japanese Application No. 2022-160462 mailed Jul. 1, 2025.

* cited by examiner

*Primary Examiner* — Rodney A Butler

(74) *Attorney, Agent, or Firm* — Harness, Dickey & Pierce, P.L.C.

(57) ABSTRACT

Correcting a deviation of the transfer position of an article is made possible. A control section includes: a position information acquiring section for acquiring, from an image taken by an image taking section, position information and a deviation of an identification code from a reference position; and an action control section for controlling the action of a transport device so as to correct the deviation of the transfer position of the article in accordance with the position information and the deviation of the identification code from the reference position.

6 Claims, 10 Drawing Sheets

SLIDE DRIVING SECTION

21

ROTATION DRIVING SECTION
(±5°)

22

UP-AND-DOWN DRIVING SECTION

Figure 11:
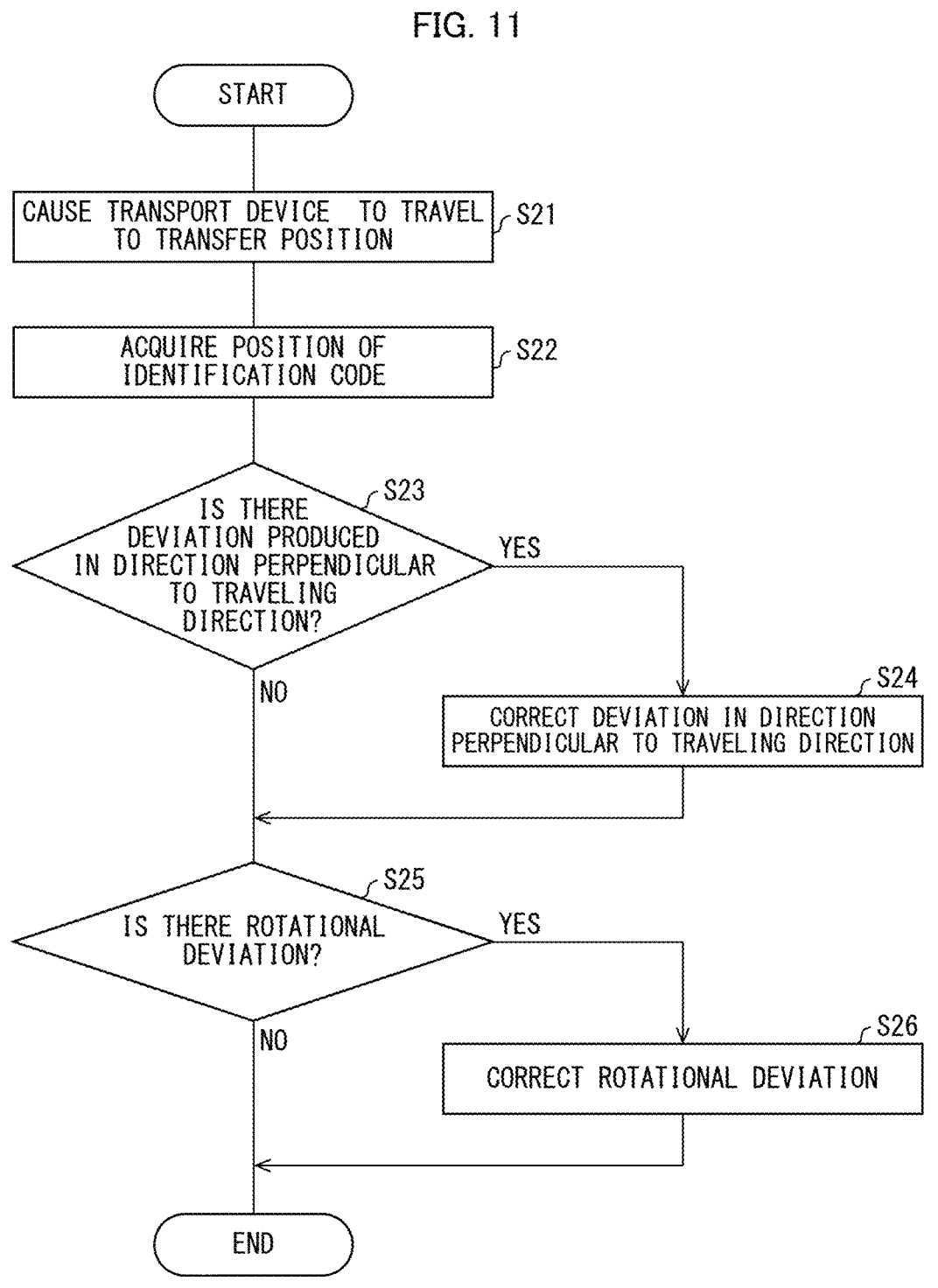

START

CAUSE TRANSPORT DEVICE TO TRAVEL
TO TRANSFER POSITION — S21

ACQUIRE POSITION OF
IDENTIFICATION CODE — S22

IS THERE
DEVIATION PRODUCED
IN DIRECTION PERPENDICULAR
TO TRAVELING
DIRECTION? — S23

YES

NO

CORRECT DEVIATION IN DIRECTION
PERPENDICULAR TO TRAVELING DIRECTION — S24

IS THERE ROTATIONAL
DEVIATION? — S25

YES

NO

CORRECT ROTATIONAL DEVIATION — S26

END

TRANSPORT DEVICE AND TRANSPORT DEVICE CONTROL METHOD

This Nonprovisional application claims priority under 35 U.S.C. § 119 on Patent Application No. 2022-160462 filed in Japan on Oct. 4, 2022, the entire contents of which are hereby incorporated by reference.

TECHNICAL FIELD

The present invention relates to a transport device and a transport device control method.

BACKGROUND ART

Recently, automated transport of articles through the use of an unmanned transport device (article transport vehicle) has been put to practical use in, for example, factories and warehouses. Unmanned transport devices often autonomously travel along a predetermined traveling path according to a program or commands issued by a superior control device through communications. Among techniques relating to this is the invention disclosed in Patent Literature 1 below.

Patent Literature 1 relates to a cart system with a track, the cart system including: a track that is disposed on a ceiling or at a position near a ceiling and that includes, on the opposite sides of the lower part thereof, travel face portions and also includes a gap between the travel face portions; and a cart that travels along the track.

The cart includes: a traveling section that travels on the travel face portions of the track; a cart body that is suspended from the traveling section with use of the gap; a detecting means that is provided in one of the traveling section and the cart body and that is for applying light and detecting the reflected light; and a reflecting means that is provided in the other one of the traveling section and the cart body and that is for reflecting, toward the detecting means, the light applied from the detecting means. The track includes a marking section (barcode) that protrudes from the travel face portion at a predetermined position toward the gap so as to interrupt the light path between the detecting means and the reflecting means.

The marking section (barcode) has stored therein, for example, detailed position information on a position on the track, and the information read by a barcode reader is transferred to an onboard controller. The onboard controller carries out control, in accordance with the position information read, such that a transport vehicle stops and a transfer action is carried out.

CITATION LIST

Patent Literature

Patent Literature 1

Japanese Patent Application Publication, Tokukai, No. 2012-150588

SUMMARY OF INVENTION

Technical Problem

Typically, in relation to a transport device which travels along a traveling path, in a case where, due to an error in production, installation, etc. of the traveling path (rails), an interval between the rails is increased, the stop position of the transport device deviates, and the transfer position of an object being transported can deviate accordingly at the time of transfer of the object. However, it is impossible to solve such a problem, even when the invention disclosed in Patent Literature 1 is used.

An aspect of the present invention is to provide a transport device capable of correcting a deviation of the transfer position of an article and a method for controlling the transport device.

Solution to Problem

In order for the above problem to be solved, a transport device in accordance with an aspect of the present invention is a transport device which travels along a traveling path to transport an article, the transport device including: an image taking section for taking an image which contains an identification code that represents position information on a position on the traveling path and that is affixed along the traveling path; and a control section for controlling an action of the transport device in accordance with the image taken by the image taking section, the control section including: a position information acquiring section for acquiring, from the image taken by the image taking section, the position information and a deviation of the identification code from a reference position; and an action control section for controlling the action of the transport device so as to correct a deviation of a transfer position of the article in accordance with the position information and the deviation of the identification code from the reference position.

Further, in order for the above problem to be solved, a transport device control method in accordance with an aspect of the present invention is a method for controlling a transport device which travels along a traveling path to transport an article, the method including: taking an image which contains an identification code that represents position information on a position on the traveling path and that is affixed along the traveling path; acquiring, from the image taken, the position information and a deviation of the identification code from a reference position; and controlling an action of the transport device so as to correct a deviation of a transfer position of the article in accordance with the position information and the deviation of the identification code from the reference position.

Advantageous Effects of Invention

With an aspect of the present invention, it is possible to correct a deviation of the transfer position of an article.

BRIEF DESCRIPTION OF DRAWINGS

FIG. 3 is a perspective view for explaining the components of a carrier.

FIG. 11 is a flowchart for explaining process steps carried out when the transport device in accordance with an embodiment of the present invention is in action.

DESCRIPTION OF EMBODIMENTS

<Overall Configuration of Transport Device 1>

Figure 1:
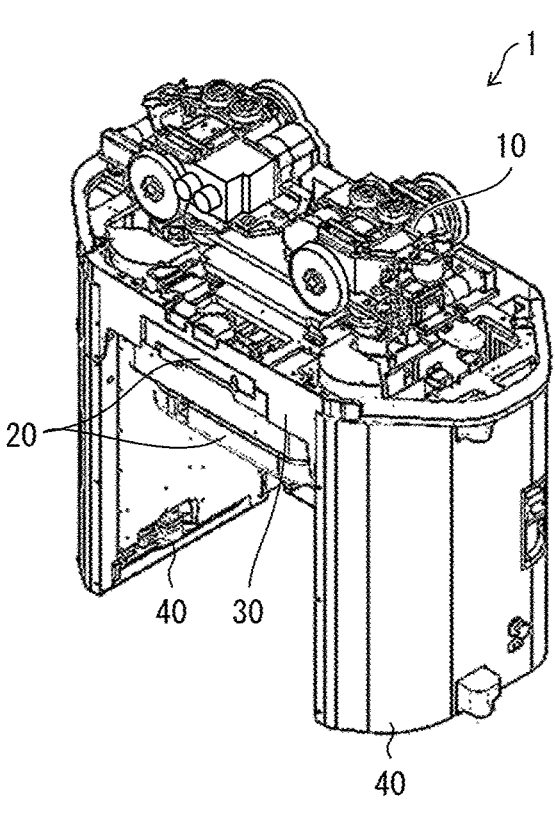
FIG. 1 is a perspective view of a transport device in accordance with an embodiment of the present invention.

The following description will discuss the configuration of a transport device in accordance with an embodiment of the present invention, with reference to the drawings. FIG. 1 is a perspective view of a transport device 1 in accordance with an embodiment of the present invention. The transport device 1 is a ceiling transport vehicle or the like which transports an article along a traveling path (which is hereinafter also referred to as a rail(s)) disposed, for example, on a ceiling or in the vicinity of a ceiling. The transport device 1 is not limited to a ceiling transport vehicle, but may be a transport vehicle or the like which, for example, transports an article along rails disposed on a floor face.

The main components of the transport device 1 are a travelling section 10, a carrier 20, a transferring mechanism 30, and an anti-falling section 40. The travelling section 10 is constituted by a front bogie and a rear bogie, as will be described later, and is driven by a traveling motor incorporated in each of the front bogie and the rear bogie to travel on the travel rails.

The carrier 20 has placed therein sections such as a slide driving section, a rotation driving section, an up-and-down driving section, and a control section, as will be described later. The control section controls the slide driving section to slide an article on board, in a direction perpendicular to a traveling direction of the transport device 1. Further, the control section controls the rotation driving section to rotate the article on board, around a rotation central axis of the transport device 1. The control section also controls the up-and-down driving section to move the transferring mechanism 30 up and down between the carrier and a transfer port.

The transferring mechanism 30 is controlled by the control section to move the article on board up and down between the carrier 20 and the transfer port.

The anti-falling section 40 is placed on each of the front side and the rear side of the carrier 20. The anti-falling section 40 holds the article with use of a clamp disposed at an end of the anti-falling section 40, to prevent an article (e.g., a front opening unified pod (FOUP) that accommodates a semiconductor substrate) which is travelling from shaking.

Figure 2:
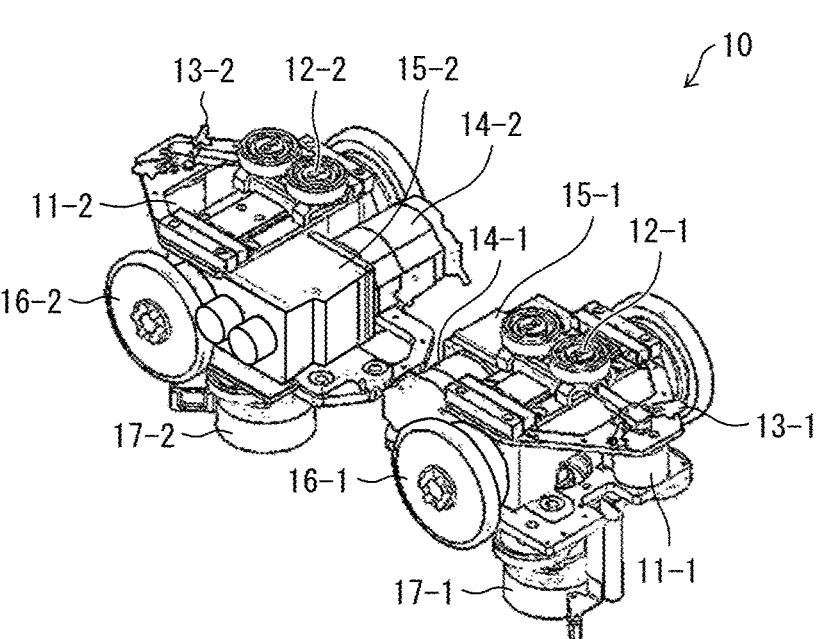
FIG. 2 is a perspective view of a traveling section.

FIG. 2 is a perspective view of the travelling section 10. As illustrated in FIG. 2, the travelling section 10 is constituted by the front bogie and the rear bogie. The front bogie includes a rotary solenoid 11-1, a branch guide roller 12-1, a branch guide sensor 13-1, a traveling motor 14-1, a gear 15-1, traveling wheels 16-1, and a side roller 17-1.

Similarly, the rear bogie includes a rotary solenoid 11-2, a branch guide roller 12-2, a branch guide sensor 13-2, a traveling motor 14-2, a gear 15-2, traveling wheels 16-2, and a side roller 17-2.

The rotary solenoids 11-1 and 11-2 are used for change in positions of the branch guide rollers 12-1 and 12-2. While the transport device 1 is traveling, for example, around a curve, through a branch part of the travel rail, and through a junction part of the travel rail, one or more of the traveling wheels become out of touch with the travel rails. To address this, the rotary solenoids 11-1 and 11-2 change the positions of the branch guide rollers 12-1 and 12-2 so that the horizontal attitude of the transport device 1 is maintained. Two branch guide rollers 12-1 and to branch guide rollers 12-2 are disposed in the front bogie and the rear bogie, respectively, and therefore are constituted by four rollers.

The branch guide sensors 13-1 and 13-2 are for determining whether the branch guide rollers 12-1 and 12-2 are on the left or on the right. The branch guide sensor 13-1 and the branch guide sensor 13-2 are disposed in the front bogie and the rear bogie, respectively.

The traveling motor 14-1 and 14-2 are AC servomotors for driving, via the gears 15-1 and 15-2, a total of four traveling wheels 16-1 and 16-2 of both of the bogies.

The gear 15-1 transfers rotation of the traveling motor 14-1 to the traveling wheels 16-1 placed on both sides of the front bogie to rotate the traveling wheels 16-1, and the gear 15-2 transfers rotation of the traveling motor 14-2 to the traveling wheels 16-2 placed on both sides of the rear bogie to rotate the traveling wheels 16-2.

The traveling wheels 16-1 and 16-2 are for causing the transport device 1 to travel by the friction between the traveling wheels and the travel rails, and two traveling wheels 16-1 and two traveling wheels 16-2 are disposed in the front bogie and the rear bogie, respectively. Therefore, the traveling wheels 16-1 and 16-2 are constituted by a total of four wheels.

The side rollers 17-1 and 17-2 are for limiting the rotational degrees of freedom of the bogies by contact with a side surface of the travel rail, and four side rollers are disposed in each of the front bogie and rear bogie. Therefore, the side rollers 17-1 and 17-2 are constituted by a total of eight rollers.

Figure 3:
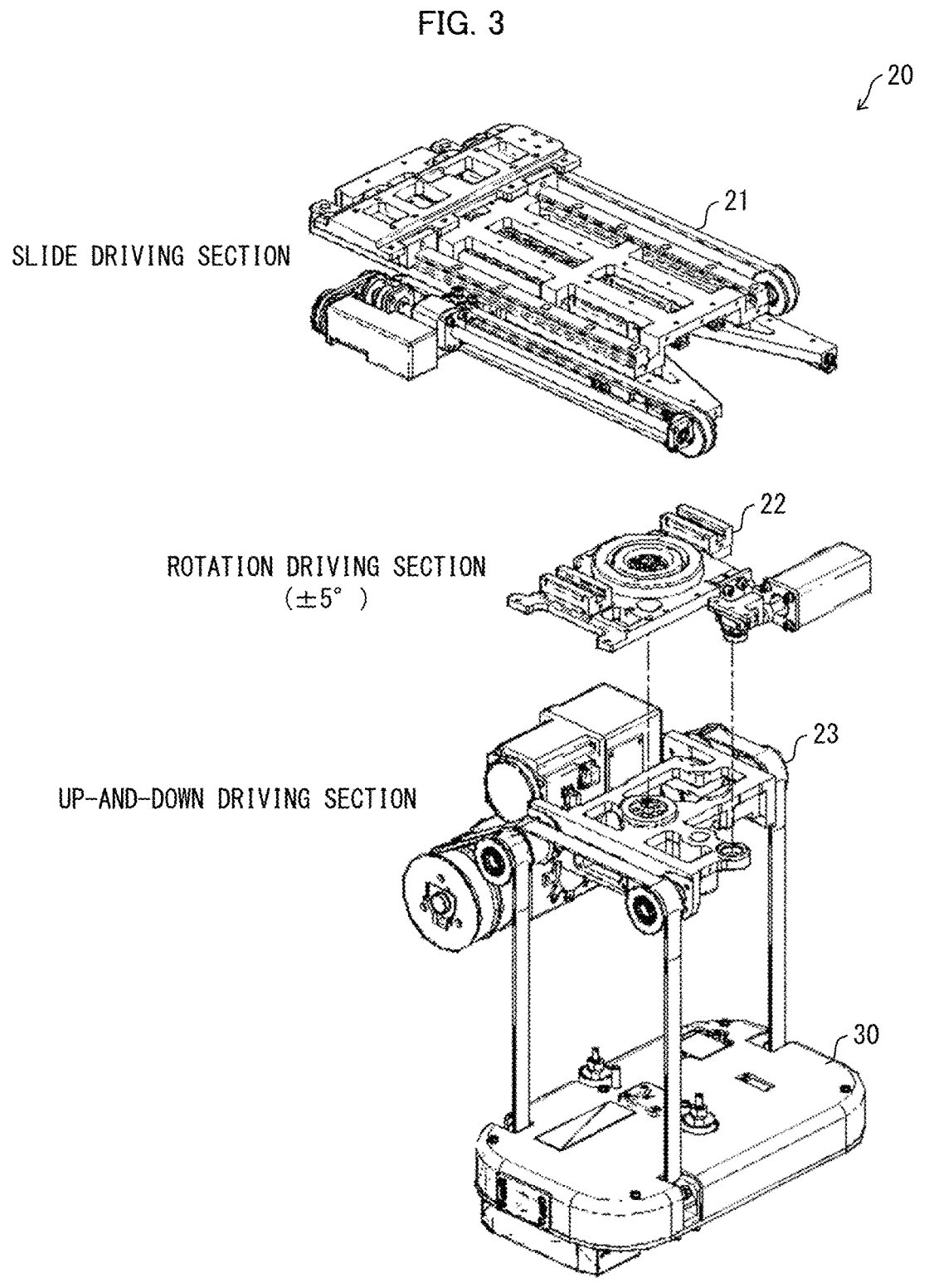

FIG. 3 is a perspective view for explaining the components of the carrier 20. The carrier 20 includes: a slide driving section 21 for sliding the article on board, in a direction perpendicular to the traveling direction of the transport device 1; a rotation driving section 22 for rotating the article on board around the rotation central axis of the transport device 1; and an up-and-down driving section 23 for moving the transferring mechanism 30 up and down.

Figure 4:
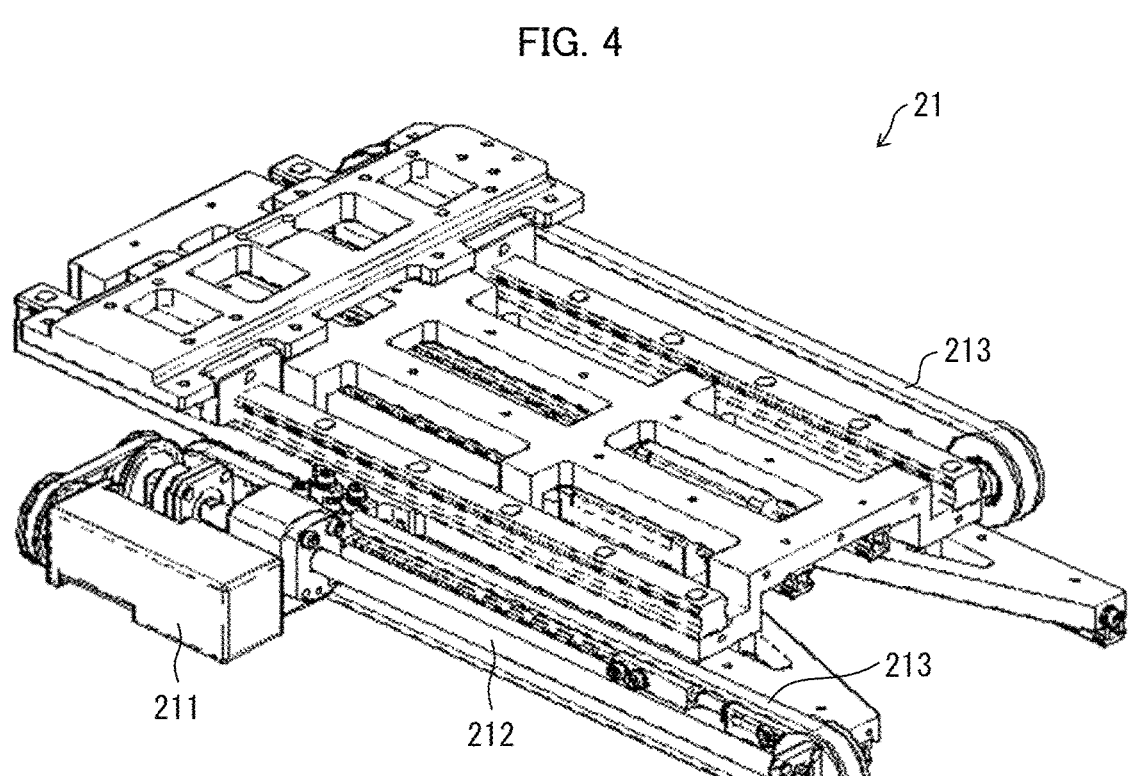
FIG. 4 is a perspective view of a slide driving section.

FIG. 4 is a perspective view of the slide driving section 21. The main components of the slide driving section 21 are a slide motor 211, a slide ball screw 212, and a slide driving belt 213.

The slide motor 211 is a servomotor for driving the slide ball screw 212. The slide ball screw 212 is for causing the slide driving section 21 to operate.

The slide driving belt 213 is for transferring power of the slide ball screw 212. The slide driving belt 213 slides the transferring mechanism 30 in a direction perpendicular to (to the left or right of) the traveling direction of the transport device 1 by the slide drive of the slide driving belt 213.

Figure 5:
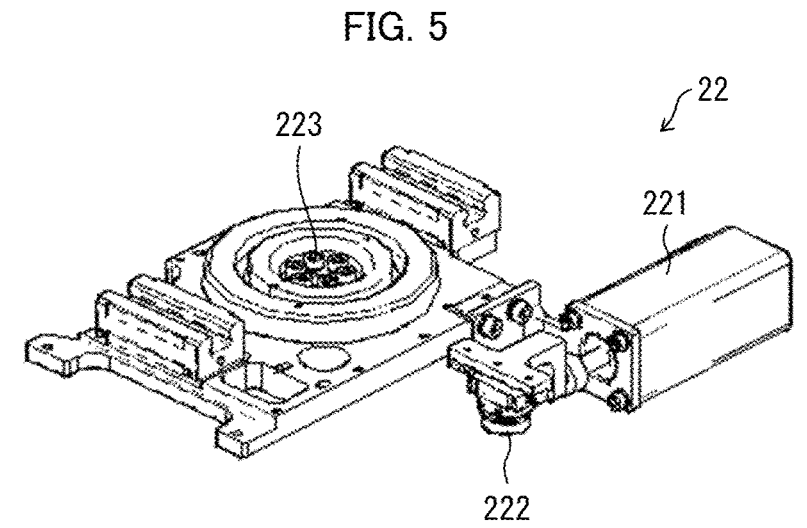
FIG. 5 is a perspective view of a rotation driving section.

FIG. 5 is a perspective view of the rotation driving section 22. The main components of the rotation driving section 22 are a rotation motor 221, a rotation ball screw 222, and a rotation central axis 223. The rotation driving section 22 is capable of rotating the transferring mechanism 30 approximately 5° in both directions around the rotation central axis 223, which is the central axis of the transport device 1.

The rotation motor 221 is a stepping motor for driving the rotation ball screw 222. The rotation ball screw 222 rotates the transferring mechanism 30 with use of the driving force via the rotation motor 221, to make fine adjustment of a transfer position.

Figure 6:
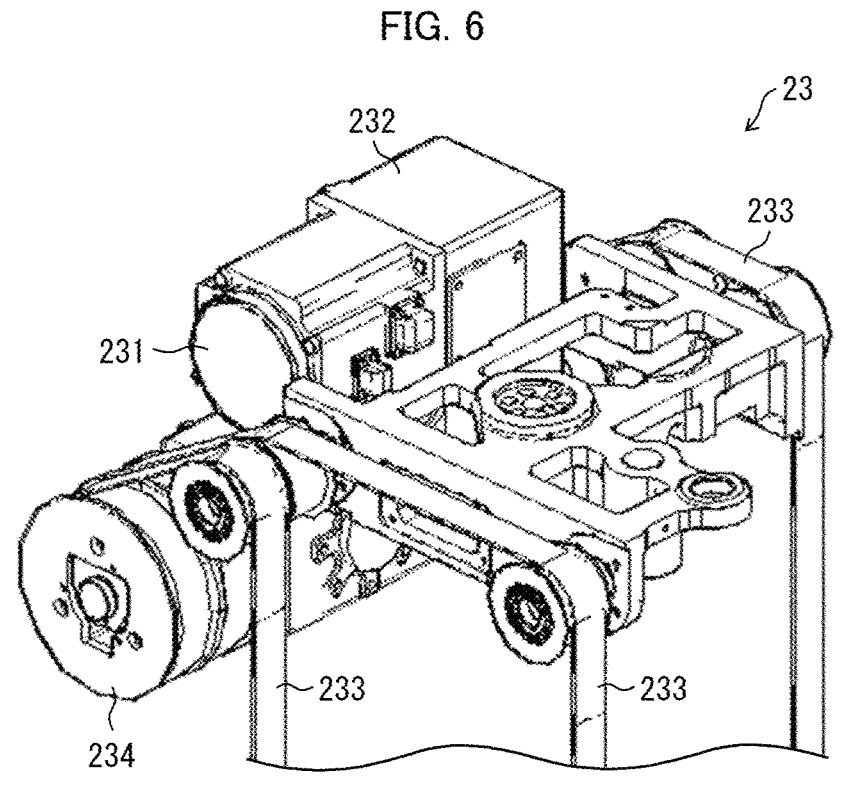
FIG. 6 is a perspective view of an up-and-down driving section.

FIG. 6 is a perspective view of the up-and-down driving section 23. The main components of the up-and-down driving section 23 are an up-and-down motor 231, a gear 232, an up-and-down belt 233, and an up-and-down belt take-up pulley 234.

The up-and-down motor 231 is a servomotor for moving the transferring mechanism 30 up and down. The gear 232 transfers the rotation of the up-and-down motor 231 to the up-and-down belt take-up pulleys 234 placed on the opposite sides.

The up-and-down belt 233 includes three belts for hanging the transferring mechanism 30. The normal and reverse rotations of the up-and-down belt take-up pulley 234 cause the transferring mechanism 30 to move up and down.

<Example Configuration of Transport System 100>

Figure 7:
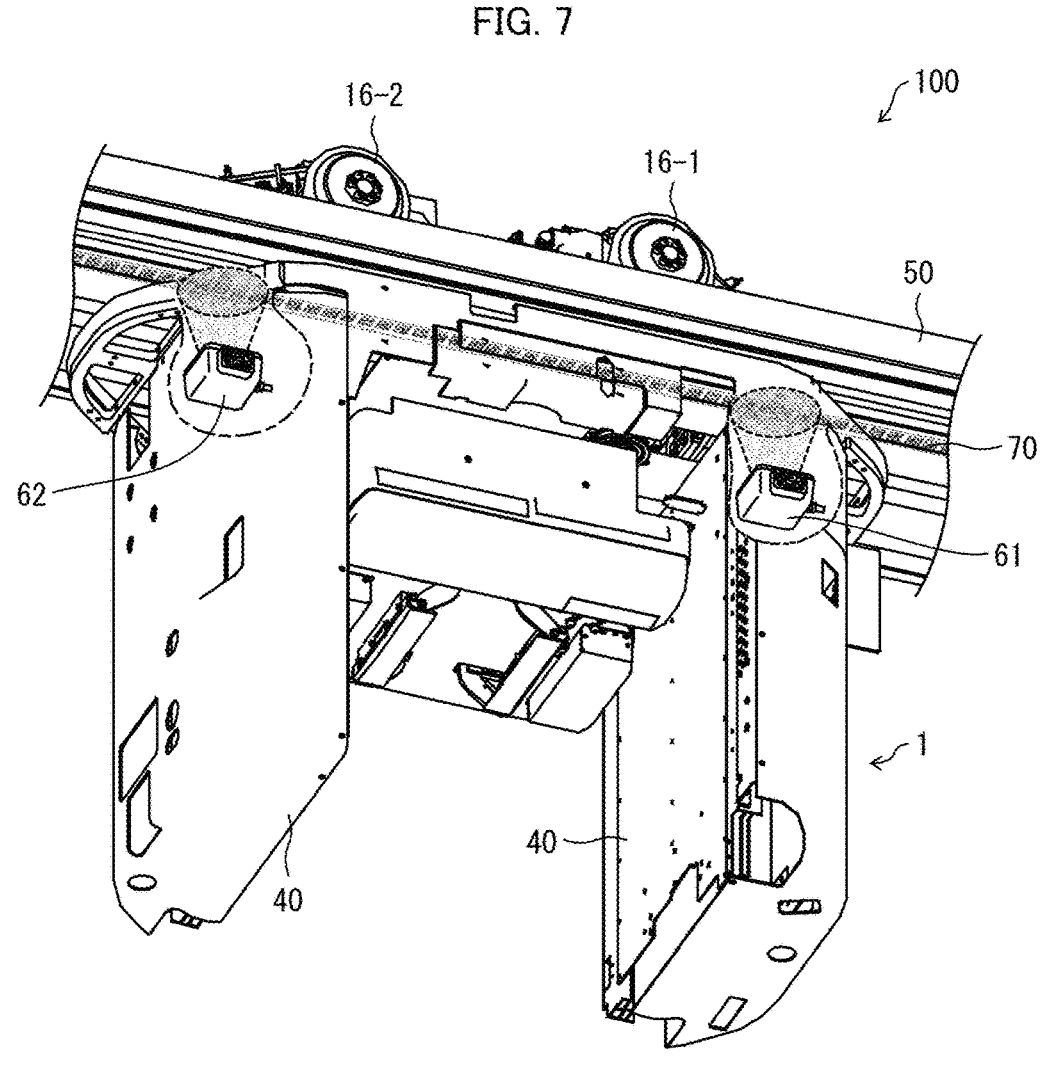
FIG. 7 is a perspective view of a transport system in accordance with an embodiment of the present invention.

FIG. 7 is a perspective view of a transport system 100 in accordance with an embodiment of the present invention. The travel rails 50, which constitute a traveling path, are disposed on the ceiling or in the vicinity of the ceiling. The transport device 1 travels on the travel rails 50 by the friction between the traveling wheels 16-1 and 16-2 of the transport device 1 and the travel rails 50.

Code tape 70 having a plurality of identification codes shown thereon is affixed along the travel rails 50. Each of the plurality of identification codes carries position information on a position on the traveling path, which is, for example, information on the distance from the start point of the travel rails 50 or coordinate information.

The identification codes are a two-dimensional code, such as a quick response (QR) code or DataMatrix. Note that the identification codes are not limited to a two-dimensional code, and may be, for example, a one-dimensional code, such as a barcode, or may be a three-dimensional code.

The transport device 1 includes image taking sections 61 and 62 for taking an image that contains an identification code shown on the code tape 70. The image taking sections 61 and 62 are placed respectively on the front side and the rear side of the transport device 1. Note that the image taking sections 61 and 62 are installed at positions that make it possible to take the images of identification codes shown on the code tape 70.

Figure 8:
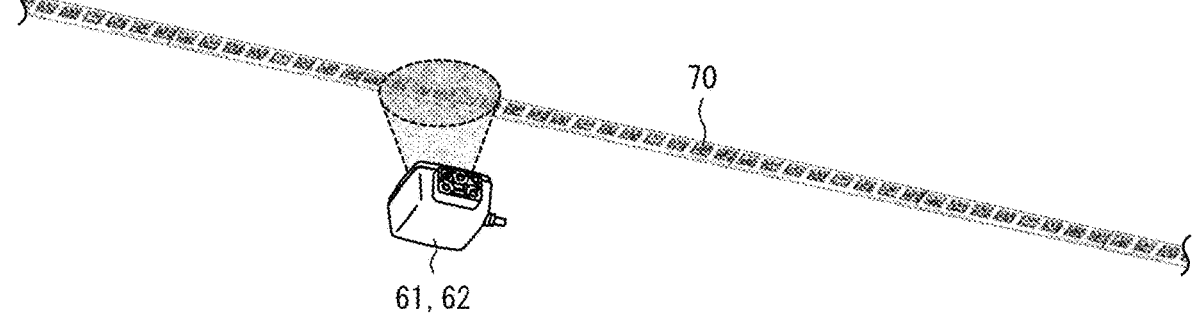
FIG. 8 is a diagram for explaining code tape having identification codes shown thereon.

FIG. 8 is a diagram for explaining the code tape 70 having identification codes shown thereon. As illustrated in FIG. 8, identification codes representing position information on a position on the travel rails 50 are successively shown on the code tape 70. The image taking sections 61 and 62 are disposed at positions that make it possible to take an image such that an identification code shown on the code tape 70 are contained in the image.

<Example Configuration of Control Section 80>

Figure 9:
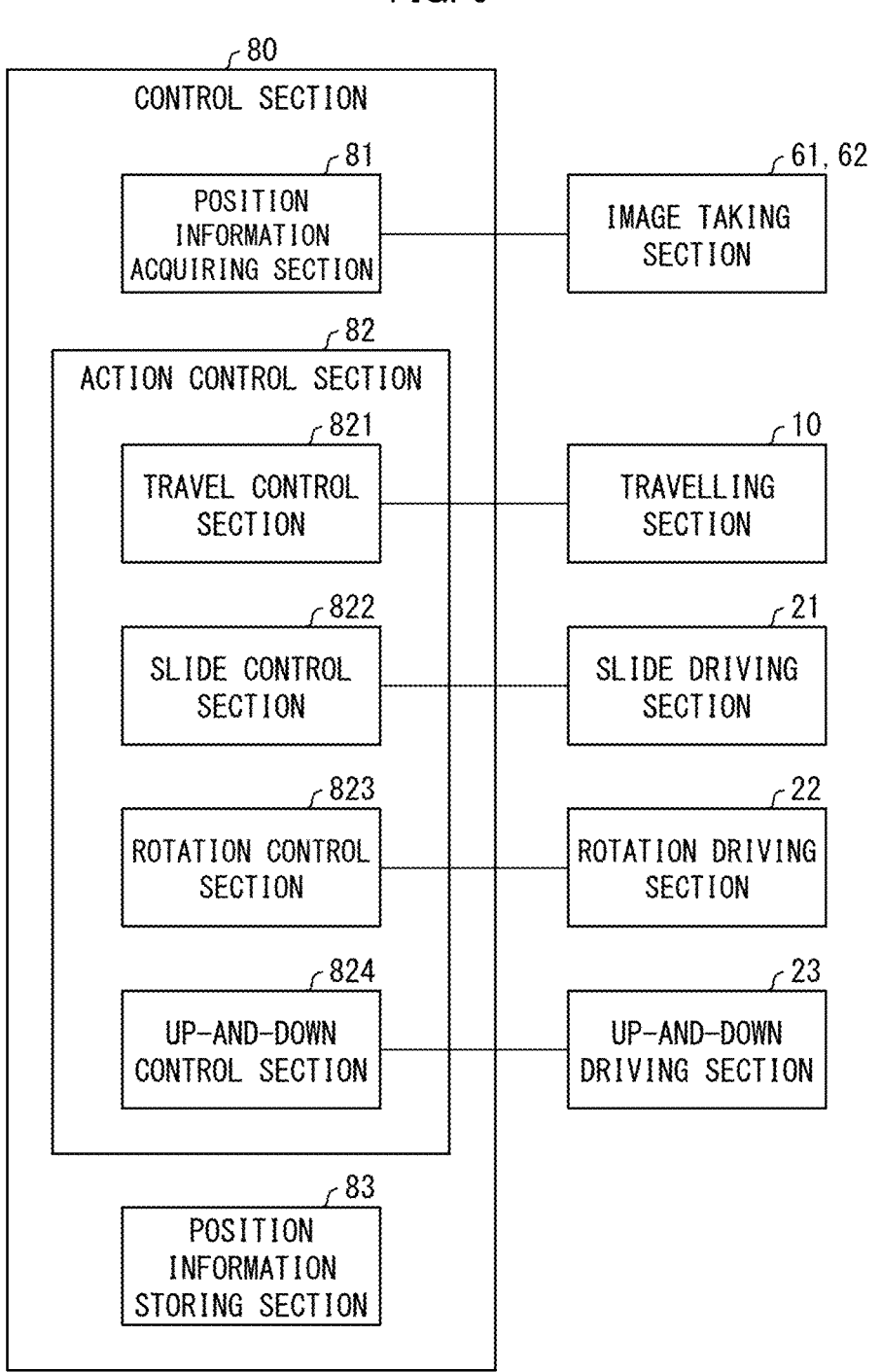
FIG. 9 is a diagram of an example configuration of a control section of the transport device in accordance with an embodiment of the present invention.

FIG. 9 is a diagram of an example configuration of a control section 80 of the transport device in accordance with an embodiment of the present invention. The control section 80 includes a position information acquiring section 81, an action control section 82, and a position information storing section 83. The action control section 82 includes a travel control section 821, a slide control section 822, a rotation control section 823, and an up-and-down control section 824.

The position information acquiring section 81 analyzes images which are taken by the image taking sections 61 and 62 and each of which contains an identification code, to acquire position information represented by the identification code. The control section 80 controls the action control section 82 such that the identification code corresponding to the transfer position of the article is located at the center of the images. The position information acquiring section 81 acquires a deviation, at the time of this control, of the identification code from the reference position. Note that the respective reference positions of identification codes are measured in advance at the time of learning (which will be described later), and stored in the position information storing section 83.

The travel control section 821 controls the travelling section 10 to cause the transport device 1 to travel to a predetermined position. For example, in a case of causing the transport device 1 to travel to the transfer position of an article, the travel control section 821 controls the travelling section 10 so as to keep the transport device 1 travelling until the identification code that represents the position information corresponding to the transfer position is located at the center of an image taken by the image taking section 61 or 62, and then causes the transport device 1 to stop at the transfer position of the article.

The slide control section 822 controls the slide driving section 21 to slide an article on board, in a direction perpendicular to the traveling direction of the transport device 1. For example, in a case where after the transport device 1 travels at the transfer position of an article, there is a deviation of the identification code that represents the position information corresponding to the transfer position, from the reference position in a direction perpendicular to the traveling direction of the transport device 1, the slide control section 822 controls the slide driving section 21 to slide the article so as to correct the transfer position of the article in the direction perpendicular to the traveling direction of the transport device 1.

The rotation control section 823 controls the rotation driving section 22 to rotate an article on board, around the rotation central axis 223 of the transport device 1. For example, in a case where after the transport device 1 travels at the transfer position of an article, there is a rotational deviation, from the reference position, of the identification code that represents the position information corresponding to the transfer position, the rotation control section 823 controls the rotation driving section 22 to rotate the article around the rotation central axis 223 of the transport device 1, to correct the transfer position of the article.

The up-and-down control section 824 controls the up-and-down driving section 23 to move, up and down, the transferring mechanism 30 having an article on board.

<Process Steps in Learning Reference Positions of Identification Codes>

Figure 10:
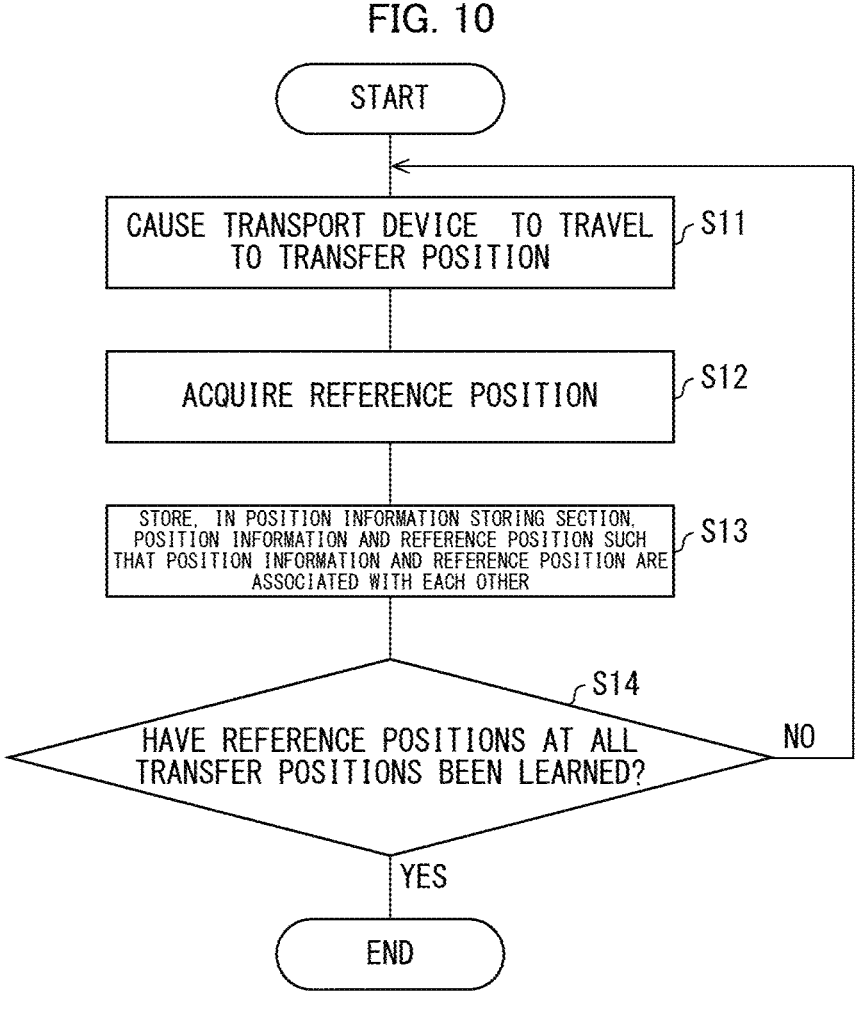
FIG. 10 is a flowchart for explaining process steps carried out when the transport device in accordance with an embodiment of the present invention learns reference positions.

FIG. 10 is a flowchart for explaining process steps carried out when the transport device 1 in accordance with an embodiment of the present invention learns reference positions. First, the travel control section 821 controls the travelling section 10 to cause the transport device 1 to travel to the transfer position of an article (S11).

Note that a plurality of transfer positions that refer to locations to which to transfer articles are determined in advance, and the transport device 1 learns the reference positions of identification codes at the plurality of transfer positions. The travel control section 821 controls the travel of the transport device 1 such that the identification code corresponding to a transfer position is located in the vicinity of the center of an image taken by the image taking section 61 or 62.

The position information acquiring section 81 acquires the position of an identification code in the image taken by the image taking section 61 or 62 to use the position as a reference position (S12), and stores, in the position information storing section 83, the position information and the reference position such that the position information and the reference position are associated with each other (S13). For example, in a case where the identification code is rectangular, the reference position is, for example, information on the coordinates of the four corners of the identification code in the image.

The reference position can deviate in a direction perpendicular to the traveling direction of the transport device 1, or can be rotationally deviates. Thus, the position information acquiring section 81 may acquire a reference amount of slide performed by the slide driving section 21 and a reference angle of rotation performed by the rotation driving section 22, the reference amount of slide and the reference angle of rotation bringing the transfer position of an article into a correct position, and store the reference amount of slide and the reference angle of rotation, along with the position information and the reference position, in the position information storing section 83.

Next, the control section 80 determines whether reference positions at all the transfer positions have been learned (S14). In a case where there is any transfer position the reference position at which has not been learned (S14, No), the process returns to step S11 to repeat the processes of step 11 and the subsequent steps. In a case where there is no transfer position the reference position at which has not been learned (S14, Yes), the process ends.

<Process Steps when Transport Device 1 is in Action>

FIG. 11 is a flowchart for explaining process steps carried out when the transport device 1 in accordance with an embodiment of the present invention is in action. First, the travel control section 821 controls the travelling section 10 to cause the transport device 1 to travel to the transfer position of an article (S21).

Next, the position information acquiring section 81 acquires the position of an identification code in the image taken by the image taking section 61 or 62 (S22). In this acquiring, the travel control section 821 controls the travel of the transport device 1 such that the center point of the identification code that represents the position information corresponding to the transfer position of the article is located on a center line at the reference position of the identification code. The center line at the reference position of an identification code is a line that passes through the center point of the reference position of the identification code and that is perpendicular to the traveling direction of the transport device 1.

Next, the control section 80 determines whether there is a deviation produced in a direction perpendicular to the traveling direction of the transport device 1 (S23). In a case where there is a deviation produced in a direction perpendicular to the traveling direction of the transport device 1 (S23, Yes), the slide control section 822 controls the slide driving section 21 to correct the amount of slide, to correct the deviation in the direction perpendicular to the traveling direction of the transport device 1 (S24), and the process proceeds to step S25.

More specifically, the slide control section 822 acquires, from the position information storing section 83, the reference amount of slide described above, and adds, to the reference amount of slide, a correction value for correcting the amount of slide that corresponds to the deviation in the direction perpendicular to the traveling direction of the transport device 1. The slide control section 822 then controls the slide driving section 21 to slide the transferring mechanism 30 by a value which is the sum of the reference amount of slide and the correction value. In a case where there is no deviation in the direction perpendicular to the traveling direction of the transport device 1 (S23, No), the process proceeds to step S25.

Figure 12:
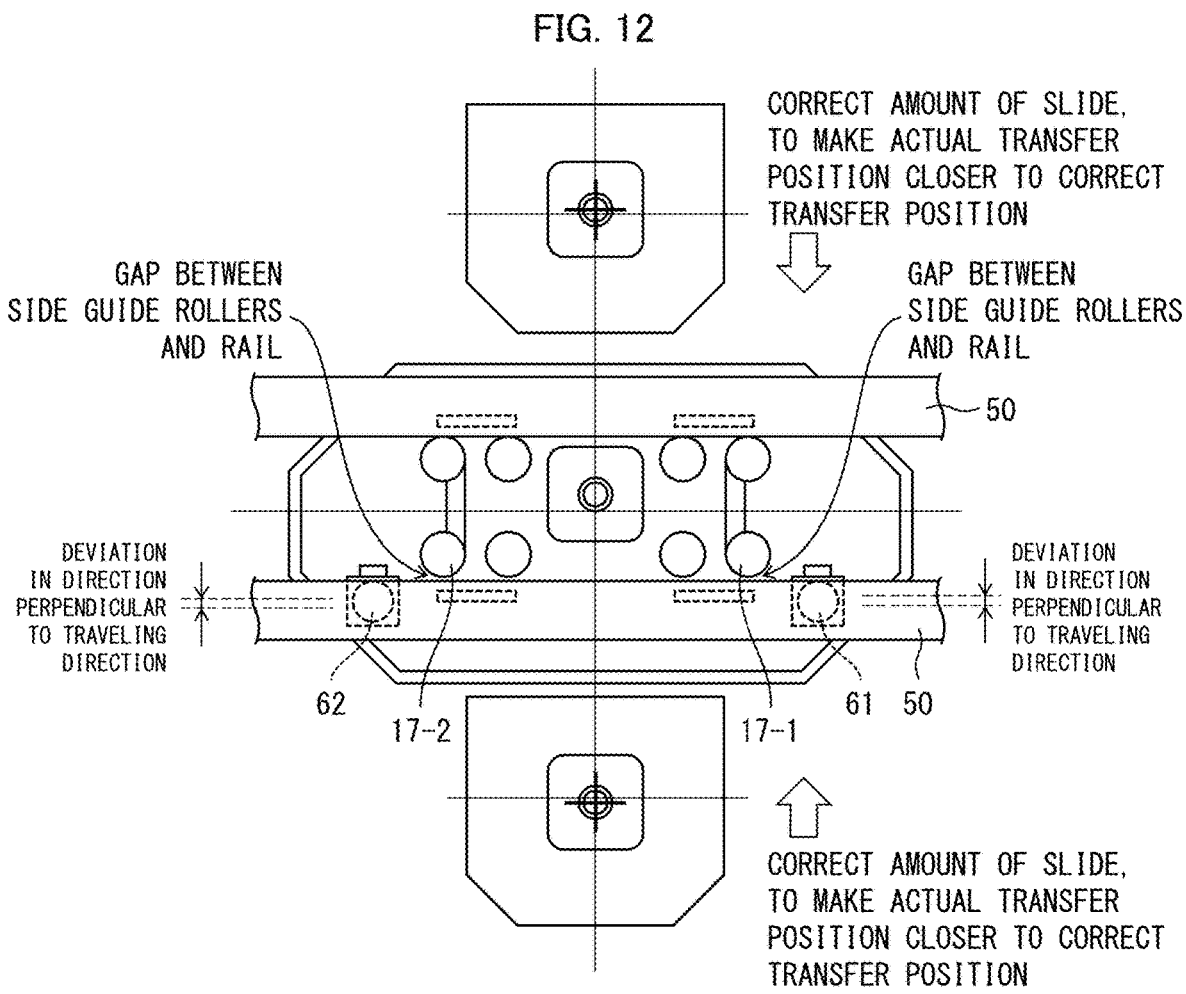
FIG. 12 is a diagram for explaining a case where there is a deviation of a transfer position in a direction perpendicular to a traveling direction of the transport device.

FIG. 12 is a diagram for explaining a case where there is a deviation of a transfer position in a direction perpendicular to a traveling direction of the transport device 1. As illustrated in FIG. 12, in a case where there is a gap between the travel rail 50 and the side rollers 17-1 and 17-2, the actual transfer position deviates in the upward direction of the drawing so as to be above the correct transfer position. The position information acquiring section 81 detects the deviation in a direction perpendicular to the traveling direction of the transport device 1, and calculates the correction value for correcting the amount of slide.

Note that when the stop position of the transport device 1 deviates, the article (e.g., FOUP) receives an increased vibration at the time of transfer. The travel rails are provided such that a clearance is created between the travel rails and the side rollers 17-1 and 17-2. Accordingly, within the extent of the clearance, the transport device 1 can rotate, or the transport device 1 can be closer to one of the travel rails than to the other. In this case, when the article is guided by kinematic pins to slide off at the time of transfer, a vibration is generated.

Here is the description of the flowchart of FIG. 11 again. In step S25, the control section 80 determines whether there is a rotational deviation with respect to the rotation central axis 223 of the transport device 1 (S25). In a case where there is a rotational deviation with respect to the rotation central axis 223 of the transport device 1 (S25, Yes), the rotation control section 823 controls the rotation driving section 22 to correct an angle of rotation, and thereby corrects the rotational deviation with respect to the rotation central axis 223 of the transport device 1 (S26). Thus the process ends.

More specifically, the rotation control section 823 acquires, from the position information storing section 83, the reference angle of rotation described above to add, to the reference angle of rotation, a correction value for correcting the angle of rotation corresponding to the rotational deviation with respect to the rotation central axis 223 of the transport device 1. The rotation control section 823 then controls the rotation driving section 22 to rotate the transferring mechanism 30 by a value which is the sum of the reference angle of rotation and the correction value. In a case where there is no rotational deviation with respect to the rotation central axis 223 of the transport device 1 (S25, No), the process ends.

Figure 13:
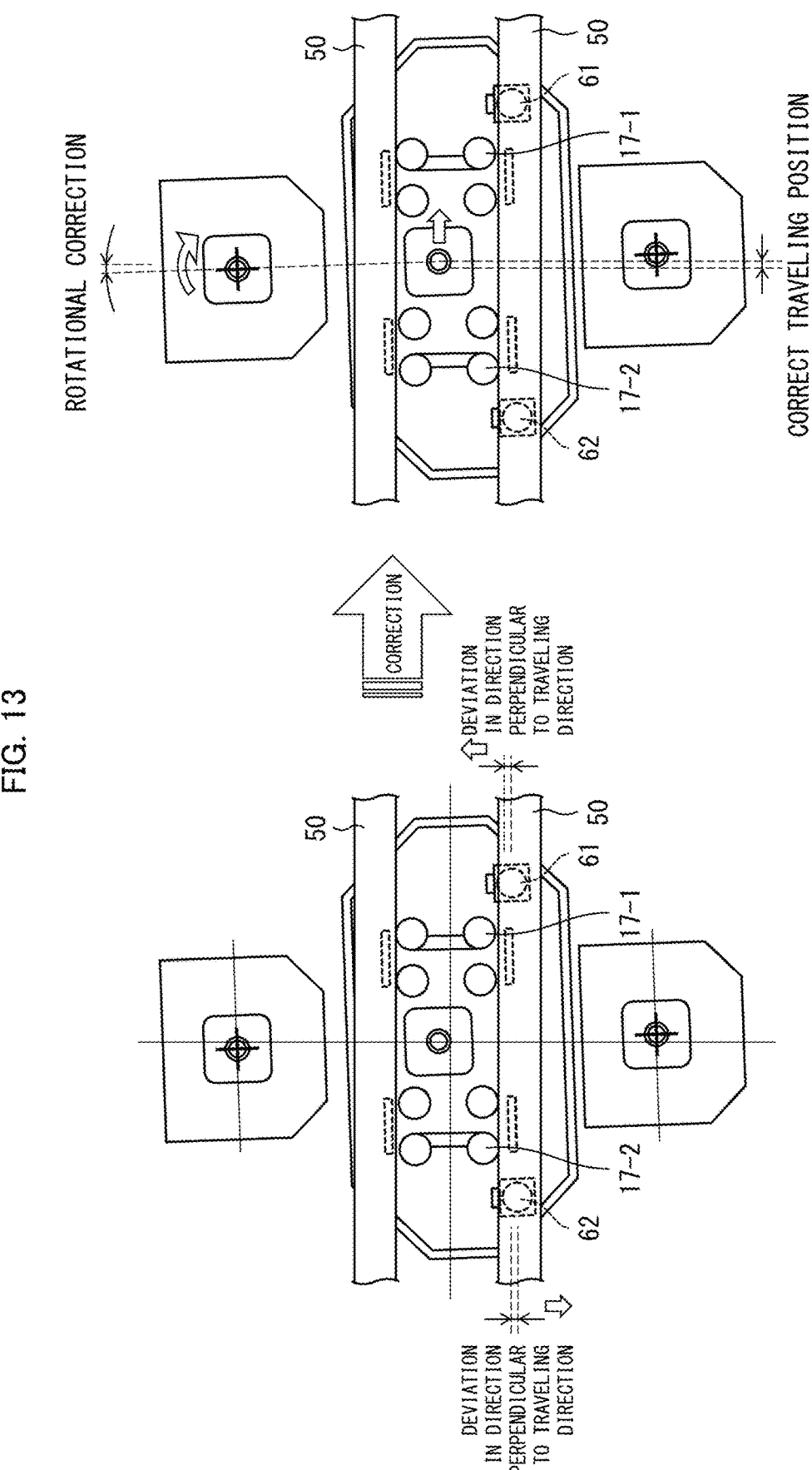
FIG. 13 is a diagram for explaining a case where there is a rotational deviation of the transfer position with respect to the rotation central axis of the transport device.

FIG. 13 is a diagram for explaining a case where there is a rotational deviation of the transfer position with respect to the rotation central axis 223 of the transport device 1. As illustrated in the left diagram of FIG. 13, in a case where there is a gap between the side roller 17-1 and one of the travel rails 50 that is lower in the drawing and there is a gap between the side roller 17-2 and one of the travel rails 50 that is upper in the drawing, the actual transfer position rotationally deviates from the correct transfer position. As illustrated in the right diagram of FIG. 13, by correcting the angle of rotation of the transferring mechanism 30, this rotational deviation is corrected. In addition, since the traveling position of the transport device 1 can deviate due to the correction of the angle of rotation, the travel control section 821 controls the travelling section 10 to correct this deviation of the traveling position.

Further, since the image taking sections 61 and 62 are capable of taking a plurality of identification codes as described above, the transfer position may be corrected by calculating the amount of correction of the angle of rotation of the transferring mechanism 30 from the deviations of identification codes that are before and after the identification code that corresponds to the transfer position.

<Effects of Transport Device 1>

As explained above, with the transport device 1 in accordance with the present embodiment, the action control section 82 controls the action of the transport device 1 so as to correct a deviation of the transfer position of an article in accordance with position information and the deviation of an identification code from a reference position. Thus, in a case where there is a deviation of the transfer position of the article in a direction perpendicular to the traveling direction of the transport device 1 or even in a case where there is a rotational deviation of the transfer position of the article with respect to the rotation central axis of the transport device 1, it is possible to easily correct the deviation of the transfer position of the article.

Since the control section 80 includes the position information storing section 83 for storing the reference position of an identification code so as to associate the reference position with the position information, it is possible for the action control section 82 to easily acquire the reference position of an identification code in accordance with the position information.

Since the action control section 82 corrects the transfer position of an article in accordance with the reference position corresponding to an identification code stored in the position information storing section 83, it is possible to easily correct the transfer position of the article.

Since in a case where there is a deviation of an identification code at the transfer position of an article, from the reference position in a direction perpendicular to the traveling direction of the transport device 1, the slide control section 822 controls the slide driving section 21 to correct the transfer position of the article in a direction perpendicular to the traveling direction of the transport device 1. Thus, even in a case where there is a deviation of the transfer position of an article in a direction perpendicular to the traveling direction of the transport device 1, it is possible to easily correct the deviation of the transfer position of the article.

In a case where there is a rotational deviation of an identification code at the transfer position of an article with respect to the reference position, the rotation control section 823 controls the rotation driving section 22 to rotate the article around the rotation central axis 223 of the transport device 1, to correct the transfer position of the article. Thus, even in a case where there is a rotational deviation of the transfer position of an article with respect to the rotation central axis 223 of the transport device 1, it is possible to easily correct the deviation of the transfer position of the article.

Since the rotation control section 823 determines, according to deviations of a plurality of identification codes from the respective reference positions, whether there is a rotational deviation of the transfer position of an article, it is possible to easily determine whether there is a rotational deviation of the transfer position of the article with respect to the rotation central axis 223 of the transport device 1. The rotation control section 823 determines whether there is a rotational deviation of the transfer position of an article, according to deviations, from the respective reference positions, of a plurality of identification codes the images of which are taken by the image taking sections 61 and 62 provided at least at two respective locations, that is, at least one location on the front side of the transport device 1 and the other location on the rear side of the transport device 1. Thus, it is possible to more precisely determine whether there is a rotational deviation of the transfer position of the article with respect to the rotation central axis 223 of the transport device 1.

In some cases, a FOUP includes tapered conical holes disposed at the bottom thereof, and is thus designed such that a certain amount of positional deviation is corrected by engaging, in the holes, positioning pins (kinematic pins) disposed in a port. However, in that case, the FOUP can bump into the kinematic pins, and thus deliver a shock to an object being transported. With the above configurations, which allow correction of a positional deviation, it is possible to prevent troubles including such delivery of a shock to an object being transported.

<Software Implementation Example>

The control blocks (in particular, control section 80) of the transport device 1 may be implemented by a logic circuit (hardware) provided in an integrated circuit (IC chip) or the like or can be alternatively implemented by software.

In the latter case, the control section 80 includes a computer that executes instructions of a program that is software implementing the foregoing functions. The computer, for example, includes at least one processor and at least one computer-readable storage medium storing the program. An object of the present invention can be achieved by the processor of the computer reading and executing the program stored in the storage medium. Examples of the processor can encompass a central processing unit (CPU). Examples of the storage medium can encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

A transport device in accordance with a first aspect of the present invention is a method for controlling a transport device which travels along a traveling path to transport an article, the transport device including:

an image taking section for taking an image which contains an identification code that represents position information on a position on the traveling path and that is affixed along the traveling path; and a control section for controlling an action of the transport device in accordance with the image taken by the image taking section, the control section including:

a position information acquiring section for acquiring, from the image taken by the image taking section, the position information and a deviation of the identification code from a reference position; and an action control section for controlling the action of the transport device so as to correct a deviation of a transfer position of the article in accordance with the position information and the deviation of the identification code from the reference position.

With this configuration, in a case where there is a deviation of the transfer position of an article in a direction perpendicular to the traveling direction of a transport device or even in a case where there is a rotational deviation of the transfer position of the article with respect to the rotation central axis of the transport device, it is possible to easily correct the deviation of the transfer position of the article.

A transport device in accordance with a second aspect of the present invention is the transport device described in the first aspect, the transport device further including a slide driving section for sliding the article on board, in a direction perpendicular to a traveling direction of the transport device, the action control section including a slide control section, the slide control section being for controlling the slide driving section to correct the transfer position of the article in a direction perpendicular to the traveling direction of the transport device, in a case where there is a deviation of the identification code at the transfer position of the article from the reference position in a direction perpendicular to the traveling direction of the transport device.

With this configuration, even in a case where there is a deviation of the transfer position of an article in a direction perpendicular to the traveling direction of a transport device, it is possible to easily correct the deviation of the transfer position of the article.

A transport device in accordance with a third aspect of the present invention is the transport device described in the first aspect, the transport device further including a rotation driving section for rotating the article on board, around a rotation central axis of the transport device, the action control section including a rotation control section, the rotation control section being for controlling the rotation driving section to rotate the article around the rotation central axis of the transport device, to correct the transfer position of the article, in a case where there is a rotational deviation, from the reference position, of the identification code at the transfer position of the article.

With this configuration, even in a case where there is a rotational deviation of the transfer position of an article with respect to the rotation central axis of a transport device, it is possible to easily correct the deviation of the transfer position of the article.

A transport device in accordance with a fourth aspect of the present invention is the transport device described in the third aspect, in which:

the image taking section is configured to take an image that contains a plurality of identification codes affixed along the traveling path;

the position information acquiring section is configured to acquire respective reference positions of the plurality of identification codes images of which are taken by the image taking section; and the rotation control section is configured to determine, according to deviations of the plurality of identification codes from the respective reference positions, whether there is a rotational deviation of the transfer position of the article.

With this configuration, it is possible to easily determine whether there is a rotational deviation of the transfer position of an article with respect to the rotation central axis of a transport device.

A transport device in accordance with a fifth aspect of the present invention is the transport device described in the third aspect, in which:

image taking sections each of which is the image taking section are provided at least at two respective locations one of which is on a front side of the transport device and the other is on a rear side of the transport device, with respect to a traveling direction of the transport device;

the position information acquiring section is configured to acquire the respective reference positions of the plurality of identification codes images of which are taken by the image taking sections provided at least at two respective locations; and the rotation control section is configured to determine, according to deviations, from the respective reference positions, of the plurality of identification codes images of which are taken by the image taking sections provided at least at the two respective locations, whether there is a rotational deviation of the transfer position of the article.

With this configuration, it is possible to more precisely determine whether there is a rotational deviation of the transfer position of an article with respect to the rotation central axis of a transport device.

A transport device in accordance with a sixth aspect of the present invention is the transport device described in any one of the first to fifth aspects, the transport device further including a traveling section for causing the article on board to travel to a transfer position, the position information acquiring section being configured to acquire, from the image that contains the identification code taken by the image taking section at the transfer position of the article, the reference position of the identification code, the control section including a position information storing section for storing the reference position of the identification code so as to associate the reference position with the position information.

With this configuration, it is possible for the action control section to easily acquire the reference position of an identification code in accordance with position information.

A transport device in accordance with a seventh aspect of the present invention is the transport device described in the sixth aspect, in which:

the action control section is configured to:

look up the position information to acquire the reference position corresponding to the identification code from the position information storing section; and correct the deviation of the transfer position of the article in accordance with the reference position corresponding to the identification code.

With this configuration, the action control section corrects a deviation of the transfer position of an article in accordance with the reference position that corresponds to an identification code and that is stored in the position information storing section. Thus, it is possible to easily correct the transfer position of the article.

A transport device control method in accordance with an eighth aspect of the present invention is a method for controlling a transport device which travels along a traveling path to transport an article, the method including:

taking an image which contains an identification code that represents position information on a position on the traveling path and that is affixed along the traveling path;

acquiring, from the image taken, the position information and a deviation of the identification code from a reference position; and an action control section for controlling an action of the transport device so as to correct a deviation of a transfer position of the article in accordance with the position information and the deviation of the identification code from the reference position.

With this configuration, in a case where there is a deviation of the transfer position of an article in a direction perpendicular to the traveling direction of a transport device or even in a case where there is a rotational deviation of the transfer position of the article with respect to the rotation central axis of the transport device, it is possible to easily correct the deviation of the transfer position of the article.

Supplementary Note

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Transport device
10: Traveling section
11-1, 11-2: Rotary solenoid
12-1, 12-2: Branch guide roller
13-1, 13-2: Branch guide sensor
14-1, 14-2: Traveling motor
15-1, 15-2: Gear
16-1, 16-2: Traveling wheel
17-1, 17-2: Side roller
20: Carrier
21: Slide driving section
22: Rotation driving section
23: Up-and-down driving section
30: Transferring mechanism
40: Anti-falling section
50: Travel rail
61, 62: Image taking section
70: Code tape
80: Control section
81: Position information acquiring section
82: Action control section
83: Position information storing section
100: Transport system
211: Slide motor
212: Slide ball screw
213: Slide driving belt
221: Rotation motor
222: Rotation ball screw
223: Rotation central axis
231: Up-and-down motor
232: Gear
233: Up-and-down belt
234: Up-and-down belt take-up pulley
821: Travel control section
822: Slide control section
823: Rotation control section 824: Up-and-down control section

The invention claimed is:

1. A transport device which travels along a traveling path to transport an article, the transport device comprising:

an image taking section for taking an image which contains an identification code that represents position information on a position on the traveling path and that is affixed along the traveling path;

a control section for controlling an action of the transport device in accordance with the image taken by the image taking section, the control section including:

a position information acquiring section for acquiring, from the image taken by the image taking section, the position information and a deviation of the identification code from a reference position; and an action control section for controlling the action of the transport device so as to correct a deviation of a transfer position of the article in accordance with the position information and the deviation of the identification code from the reference position; and a rotation driving section for rotating the article on board, around a rotation central axis of the transport device, wherein the action control section includes a rotation control section, the rotation control section being for controlling the rotation driving section to rotate the article around the rotation central axis of the transport device, to correct the transfer position of the article, in a case where there is a rotational deviation, from the reference position, of the identification code at the transfer position of the article.

2. The transport device according to claim 1, wherein:

the image taking section is configured to take an image that contains a plurality of identification codes affixed along the traveling path;

the position information acquiring section is configured to acquire respective reference positions of the plurality of identification codes images of which are taken by the image taking section; and the rotation control section is configured to determine, according to deviations of the plurality of identification codes from the respective reference positions, whether there is a rotational deviation of the transfer position of the article.

3. The transport device according to claim 1, wherein:

image taking sections each of which is the image taking section are provided at least at two respective locations one of which is on a front side of the transport device and the other is on a rear side of the transport device, with respect to a traveling direction of the transport device;

the position information acquiring section is configured to acquire the respective reference positions of the plurality of identification codes images of which are taken by the image taking sections provided at least at two respective locations; and the rotation control section is configured to determine, according to deviations, from the respective reference positions, of the plurality of identification codes images of which are taken by the image taking sections provided at least at the two respective locations, whether there is a rotational deviation of the transfer position of the article.

4. A transport device which travels along a traveling path to transport an article, the transport device comprising:

an image taking section for taking an image which contains an identification code that represents position information on a position on the traveling path and that is affixed along the traveling path;

a control section for controlling action of the transport device in accordance with the image taken by the image taking section, the control section including:

a position information acquiring section for acquiring, from the image taken by the image taking section, the position information and a deviation of the identification code from a reference position; and an action control section for controlling the action of the transport device so as to correct a deviation of a transfer position of the article in accordance with the position information and the deviation of the identification code from the reference position; and a traveling section for causing the article on board to travel to a transfer position, the position information acquiring section being configured to acquire, from the image that contains the identification code taken by the image taking section at the transfer position of the article, the reference position of the identification code, and the control section including a position information storing section for storing the reference position of the identification code so as to associate the reference position with the position information.

5. The transport device according to claim 4, wherein the action control section is configured to:

look up the position information to acquire the reference position corresponding to the identification code from the position information storing section; and correct the deviation of the transfer position of the article in accordance with the reference position corresponding to the identification code.

6. A transport device which travels along a traveling path to transport an article, the transport device comprising:

an image taking section for taking an image which contains an identification code that represents position information on a position on the traveling path and that is affixed along the traveling path;

a control section for controlling an action of the transport device in accordance with the image taken by the image taking section, the control section including:

a position information acquiring section for acquiring, from the image taken by the image taking section, the position information and a deviation of the identification code from a reference position; and an action control section for controlling the action of the transport device so as to correct a deviation of a transfer position of the article in accordance with the position information and the deviation of the identification code from the reference position; and a slide driving section for sliding the article on board, in a direction perpendicular to a traveling direction of the transport device, wherein the action control section includes a slide control section, the slide control section being for controlling the slide driving section to correct the transfer position of the article in a direction perpendicular to the traveling direction of the transport device, in a case where there is a deviation of the identification code at the transfer position of the article from the reference position in a direction perpendicular to the traveling direction of the transport device.

* * * * *